United States Patent [19]

Dale

[11] 4,335,268
[45] Jun. 15, 1982

[54] PARTICLE TRAP WITH DIELECTRIC BARRIER FOR USE IN GAS INSULATED TRANSMISSION LINES

[75] Inventor: Steinar J. Dale, Monroeville, Pa.

[73] Assignee: Westinghouse Electric Corp., Pittsburgh, Pa.

[21] Appl. No.: 206,753

[22] Filed: Nov. 14, 1980

[51] Int. Cl.³ .......................... H01B 9/06; H01B 9/04; H02G 5/06
[52] U.S. Cl. ...................................... 174/14 R; 174/28
[58] Field of Search ...................... 174/14 R, 16 B, 27, 174/28, 29, 99 R, 99 B; 307/147; 361/233

[56] References Cited

U.S. PATENT DOCUMENTS 3,515,939  6/1970  Trump .......................... 174/14 R X
3,895,176  7/1975  Cookson et al. ....................... 174/28
4,064,353  12/1977  Bolin .................................. 174/14 R
4,084,064  4/1978  Bowman ............................ 174/14 R
4,085,807  4/1978  Bolin .................................. 174/14 R Primary Examiner—Laramie E. Askin
Attorney, Agent, or Firm—M. S. Yatsko

[57] ABSTRACT

A gas-insulated transmission line includes an outer sheath, an inner conductor within the outer sheath, insulating supports supporting the inner conductor within the outer sheath, and an insulating gas electrically insulating the inner conductor from the outer sheath. An apertured particle trapping electrode is disposed within the outer sheath, and the electrode has a pair of dielectric members secured at each longitudinal end thereof, with the dielectric members extending outwardly from the apertured electrode.

9 Claims, 7 Drawing Figures

PARTICLE TRAP WITH DIELECTRIC BARRIER FOR USE IN GAS INSULATED TRANSMISSION LINES

GOVERNMENT RIGHTS STATEMENT

The Government has rights in this invention pursuant to Contract No. ET-78-C-01-3029 awarded by the U.S. Department of Energy.

CROSS-REFERENCE TO RELATED APPLICATION

Reference is made to the below-listed pending application which has as a coinventor the inventor of the instant application.

1. U.S. patent application Ser. No. 206,755, filed Nov. 14, 1980, entitled "Hybrid Particle Traps and Conditioning Procedure for Gas-Insulated Transmission Lines" by S. J. Dale and A. H. Cookson.

BACKGROUND OF THE INVENTION

This invention relates generally to high-voltage electrical apparatus, and more particularly to an improved particle trapping system for use in gas insulated transmission lines.

High-voltage gas-insulated transmission lines typically comprise an outer sheath or enclosure at low or ground potential, an inner conductor at high potential with respect to the grounded outer sheath which is disposed within the outer sheath, and support insulators for insulatively supporting the inner conductor within the outer sheath. An isulating gas is generally utilized to electrically insulate the inner conductor from the outer sheath, with the result that the high dielectric strength of the insulating gas enables closer, more compact spacings between the inner conductor and the outer sheath. Sulfur hexafluoride has been utilized as the insulating gas for many reasons associated with its useful combination of vapor pressure, chemical stability, cost, electric strength, thermal conductivity, and non-toxicity, among other properties.

One problem which has arisen in the design of these high-voltage gas-insulated transmission lines is the effect of the mobile conducting or semi-conducting particles. These particles may be remaining in the line after assembly, or may be produced during operation, and can traverse between the outer sheath and the inner conductor to thereby cause sparking, corona, or can lead to flashovers and breakdown of the insulating gas or the insulating support. These contamination particles can lower the breakdown strength of the sulfur hexafluoride gas. In order to overcome these particle effects, it may be necessary to increase the size of the gas-insulated transmission line, or include within the transmission line means for eliminating or deactivating the conducting particles.

One means utilized in the prior art to deactivate these particles has been the use of low electric field regions as taught by Trump in U.S. Pat. No. 3,515,939. The low field regions are created by including within the transmission line conducting electrodes which are electrically connected to the outer sheath and which have portions thereof spaced therefrom, so that a low field region is formed between the electrode and the outer sheath. These electrodes are generally known as particle traps.

The principle of a particle trap is to create a region of very low or zero field in the compressed gas insulated transmission system into which particles can be moved by an electric field. The trap usually consists of a longitudinal metallic sheild or cylinder mounted around the insulator inside and spaced apart from the bottom of the outer sheath. Slots are provided in the bottom of the trap surface for particles to fall through and into the low field region where they are deactivated.

It has been found that with such an elevated trap most of the particle contaminates are captured by migrating through the opening between the trap and the enclosure when the applied 60 Hertz voltage to the inner conductor is just above the voltage required for the particles to be lifted off the outer sheath surface. The activity and bounce height of the particles are then limited and the particles move and remain close to the outer sheath surface. This condition is most desirable for effective particle migration into the traps and because it reduces the chance of particles moving onto the insulator or moving to the high field conductor where they could cause breakdown. Once the particles are in the trap area, it is important that they be retained and not be permitted to escape again at a higher voltage, as this escape may result in breakdown and thus damage to the system requiring the transmission line section to be opened and repaired.

SUMMARY OF THE INVENTION

In accordance with this invention, an improved gas-insulated transmission line is provided which includes a cylindrical outer sheath at low potential with an inner conductor at high potential disposed within the outer sheath. An insulating gas electrically insulates the inner conductor from the outer sheath, and means are provided for insulatably supporting the inner conductor within the outer sheath. An apertured electrode is disposed within, and electrically connected to, the outer sheath so as to form a low field region between the electrode and the outer sheath. A dielectric member is secured to at least one longitudinal end of the electrode and extends outwardly therefrom.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
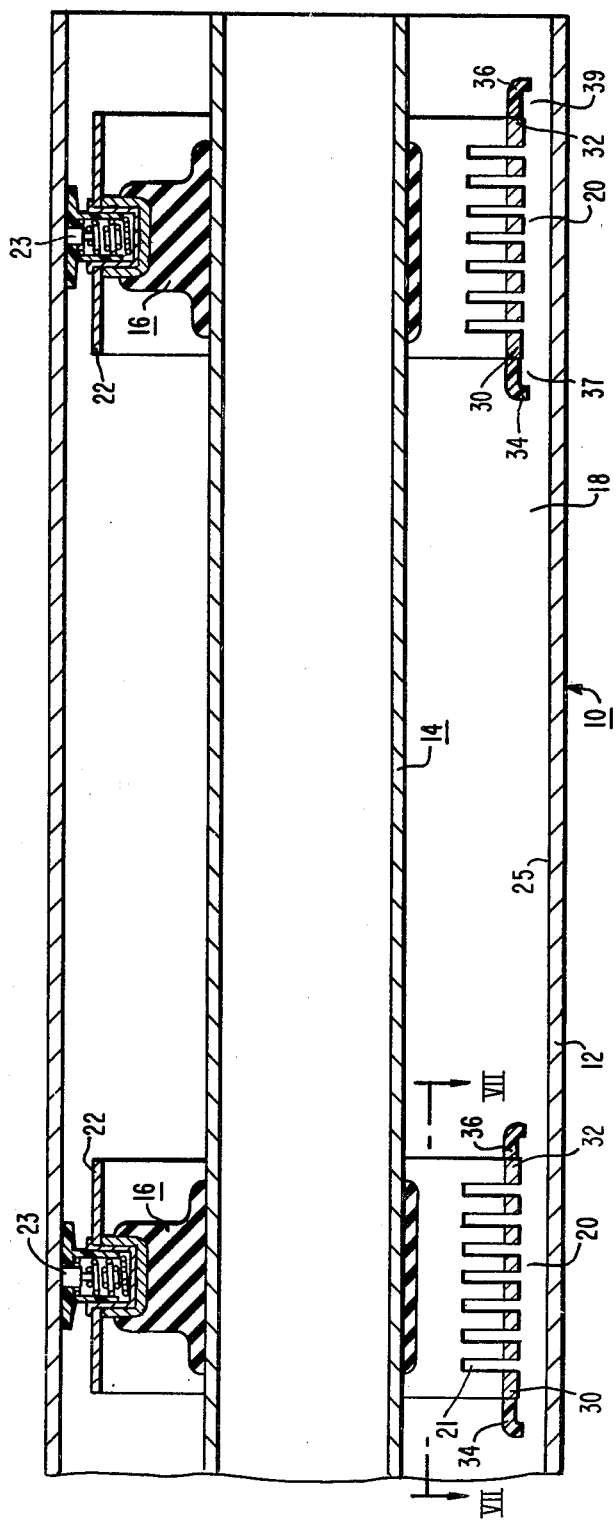
FIG. 1 is a sectional view of a gas-insulated transmission line utilizing the teachings of this invention.

Referring now more particularly to FIG. 1, therein is illustrated a gas-insulated transmission line 10 according to the teachings of this invention. The transmission line 10 is comprised of an elongated, cylindrical outer sheath 12 at low or ground electrical potential, with an inner conductor 14 at high electric potential with respect to the outer sheath 12 disposed within the outer sheath 12. The inner conductor 14 would be at an electrical potential of, for example, 121–1200 kV and both the outer sheath 12 and the inner conductor 14 would be constructed of a good electrically conducting material such as aluminum. An insulating gas 18, typical of which is sulfur hexafluoride at a pressure of 50 pounds per square inch gauge, is disposed within the outer sheath 12 and electrically insulates the inner conductor 14 from the outer sheath 12. A plurality of insulating supports 16 are utilized for insulatably supporting the inner conductor 14 within the outer sheath 12. An apertured electrode, or particle trapping ring 22, is disposed within the outer sheath 12 adjacent to, and secured to, the insulating support 16, and is electrically connected to the outer sheath 12 by means such as the contact button 23. A more detailed description of the electrical connection between the apertured electrode 22 and the outer sheath 12 can be found in U.S. Pat. No. 4,084,064.

The electrode 22 has a plurality of apertures or slots 21 in the surface thereof to allow any contamination particles which may be present within the insulating gas 18 to fall therethrough. The apertured electrode 22, as shown, is elevated above the bottom interior surface 25 of the outer sheath 12 to allow particles to enter the low or zero field region 20 which exists under the electrode 22 between the electrode 22 and the outer sheath 12. In order to ensure that particles which come to rest opposite the longitudinal ends 30, 32 of the apertured electrode 22 at a given voltage level do not reenter the transmission line 10 when the voltage is increased, the electrode 22 is extended by a pair of dielectric members 34, 36. The dielectric member 34 is secured to the longitudinal end 30 of the electrode 22, and the dielectric member 36 is secured to the longitudinal end 32 of the electrode 22. Both dielectric members 34, 36 extend outwardly from the electrode 22, and, as illustrated in FIG. 1, extend both longitudinally and radially outwardly from the electrode 22 along a curve or arc. The dielectric members 34, 36 are curved such that any particles which are lifted from opposite the longitudinal end sections 30, 32 under the dielectric numbers 34, 36 are deflected back into the much lower field region 20 between the electrode 22 and the outer sheath 12.

Because the most likely mode of particle trapping is the capture of particles through the edge opening 37, 39 between the elevated electrode 22 and the outer sheath 12, the dielectric members 34, 36 remain spaced apart from the outer sheath 12. By being so spaced apart, any contamination particles within the transmission line 10 can walk or bounce under the dielectric members 34, 36 to become trapped in the low field region 20 between the electrode 22 and the outer sheath 12.

The dielectric barrier 34, 36 is formed of an insulating plastic material such as Plexiglass, although other dielectric materials with low resistivities may also be utilized.

Figure 2:
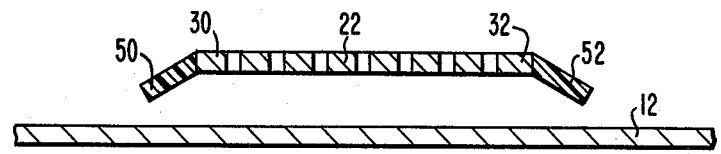
FIGS. 2, 3, 4 and 5 are detailed sectional views illustrating modifications to the dielectric member illustrated in FIG. 1.
Figure 3:
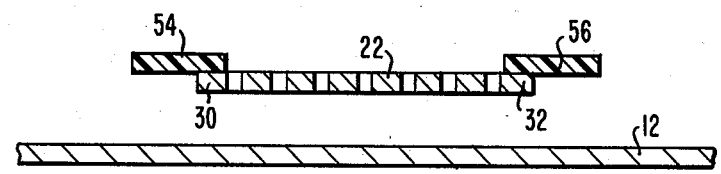

Referring now to FIGS. 2-5, therein are illustrated modifications of the dielectric members 34, 36 from that illustrated in FIG. 1. In FIG. 2, the dielectric members 50, 52 extend both longitudinally outwardly and radially outwardly from the longitudinal end 30, 32, respectively, of the apertured electrode 22. These dielectric members 50, 52 are sloped away from the electrode 22 at an angle of about 45° from the plane of the electrode 22. In FIG. 3, the dielectric members 54, 56 extend only longitudinally outwardly from the ends 30, 32, respectively, of the electrode 22. In this modification, the dielectric members 54, 56 do not extend radially outwardly. Although the configuration illustrated in FIG. 3 may be utilized, this configuration does not perform significantly different from the use of the apertured electrode 22 only without the inclusion of the dielectric members 54, 56.

Figure 4:
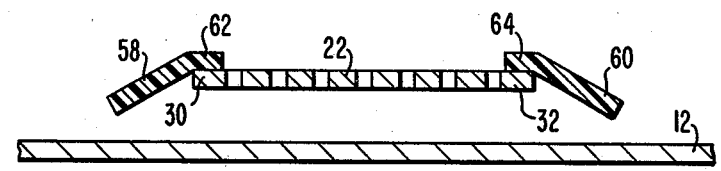

FIG. 4 illustrates the use of dielectric members 58, 60 which extend both longitudinally and radially outwardly rom the apertured electrode 22, but provide inwardly extending extensions 62, 64, respectively, which may be provided for ease of securing the dielectric members 58, 60 to the ends 30, 32 of the electrode 22.

Figure 5:
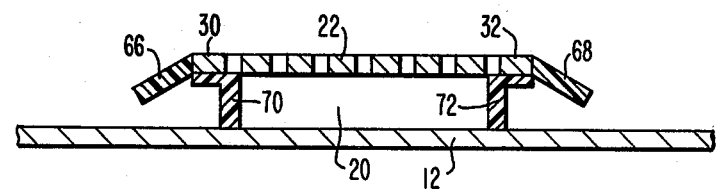

In FIG. 5, dielectric members 66, 68 are secured to the longitudinal ends 30, 32 of the apertured electrode 22, similarly to that illustrated in FIG. 2. However, in this modification of FIG. 5, a pair of insulating seals or sliders 70, 72 are disposed intermediate, and contact, both the apertured electrode 22 and the outer sheath 12. The purpose of these seals 70, 72 is to retain particles inside the low field region 20 between the apertured electrode 22 and the outer sheath 12, as more fully described in U.S. Pat. No. 4,085,807.

Figure 6:
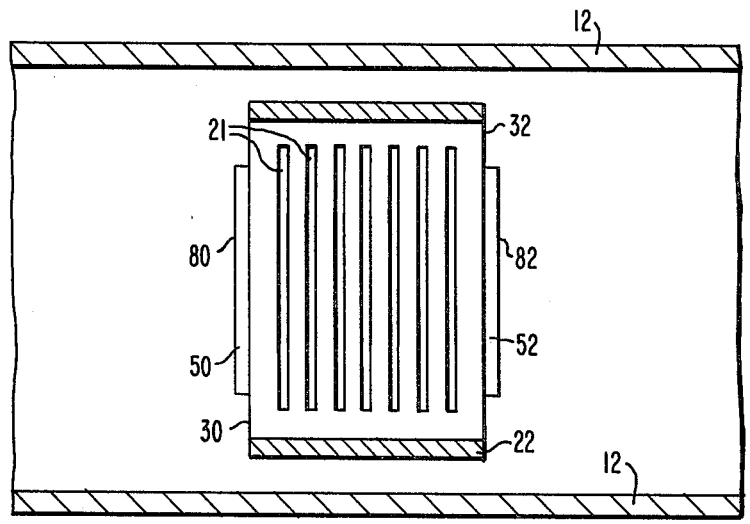
FIGS. 6 and 7 are plan views illustrating two possible structural configurations for the longitudinal extent of the dielectric member, the views being taken in the direction of the arrows on line VII—VII in FIG. 1.
Figure 7:
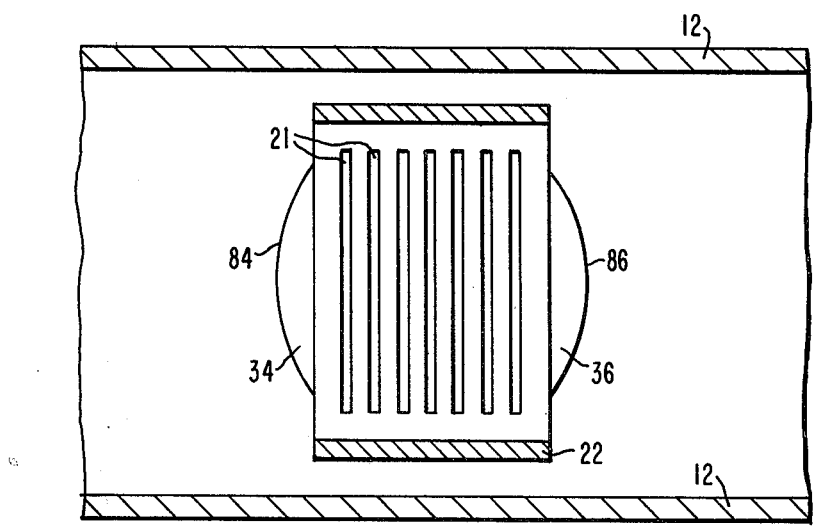

Referring now to FIGS. 6 and 7, therein in plan view are illustrated dielectric members such as those shown in FIGS. 1-5. As shown in FIG. 6, the dielectric members 50, 52, at their longitudinal ends 80, 82 respectively, distal from the apertured electrode 22 are shaped so that these ends 80, 82 extend along a substantially straight line parallel to the edges 30, 32 of the electrode 22. The longitudinally extending distance from the edge 80 of the dielectric member 50 to the longitudinal end 30 of the electrode 22 would be, for example, on the order of 10 mm.

In FIG. 7, the dielectric members 34, 36 have, at their longitudinally extending ends 84, 86, respectively, distal from the apertured electrode 22, a shape which extends generally along an arc. The arcuate or curved shape of the end 84 of the dielectric member 34, for example, will easily allow particles which are bouncing up on the outer sheath 12 wall to enter under the dielectric member 34 from the side.

Thus, what has been described is a transmission line which utilizes an improved particle trap to minimize or eliminate the deleterious effect of any contamination particles which may be present within the transmission line.

I claim:

1. A gas insulated transmission line comprising:
   a cylindrical outer sheath at low electric potential;
   an inner conductor at high electric potential with respect to said outer sheath disposed within said outer sheath;
   an insulating gas electrically insulating said inner conductor from said outer sheath;
   means for insulatably supporting said inner conductor within said outer sheath;
   an electrode disposed within, and electrically connected to, said outer sheath, said electrode being spaced-apart from said outer sheath to form a low field region therebetween, said electrode having first and second longitudinal ends; and
   a first dielectric member secured to said electrode first longitudinal end and extending longitudinally outwardly therefrom.

2. The transmission line according to claim 1 including a second dielectric member secured to said electrode second longitudinal end and extending longitudinally outwardly therefrom.

3. The transmission line according to claim 1 wherein said first dielectric member extends longitudinally and radially outwardly from said electrode first longitudinal end.

4. The transmission line according to claim 3 wherein said first dielectric member extends outwardly along an arc.

5. The transmission line according to claim 3 wherein said first dielectric member extends outwardly from said electrode first longitudinal end at an angle of about 45 degrees from the plane of said electrode.

6. The transmission line according to claim 3 wherein said first dielectric member is spaced-apart from said outer sheath.

7. The transmission line according to claim 1 including an insulating seal disposed intermediate, and contacting, said electrode first longitudinal end and said outer sheath.

8. The transmission line according to claim 1 or 3 wherein the longitudinal end of said first dielectric member distal from said electrode extends along an arc.

9. The transmission line according to claim 1 or 3 wherein the longitudinal end of said first dielectric member distal from said electrode extends along a substantially straight line.

* * * * *